(12) United States Patent
Fukatani et al.

(10) Patent No.: US 7,491,440 B2
(45) Date of Patent: Feb. 17, 2009

(54) INTERLAYER FILM FOR LAMINATE GLASS AND LAMINATE GLASS

(75) Inventors: Juichi Fukatani, Koka (JP); Bungo Hatta, Koka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 350 days.

(21) Appl. No.: 10/544,635

(22) PCT Filed: Dec. 14, 2004

(86) PCT No.: PCT/JP2004/018663

§ 371 (c)(1), (2), (4) Date: Dec. 21, 2005

(87) PCT Pub. No.: WO2005/066094

PCT Pub. Date: Jul. 21, 2005

(65) Prior Publication Data

US 2006/0110593 A1    May 25, 2006

(30) Foreign Application Priority Data

Dec. 26, 2003  (JP) .............................. 2003-432891

(51) Int. Cl.
  *B32B 5/16*  (2006.01)
  *B32B 17/10* (2006.01)
  *B32B 27/42* (2006.01)

(52) U.S. Cl. ................... 428/328; 359/350; 359/359; 359/361; 428/437; 428/524; 428/525; 523/135

(58) Field of Classification Search ................. 359/350, 359/359, 361; 428/328, 437, 524, 525; 523/135
See application file for complete search history.

(56) References Cited

U.S. PATENT DOCUMENTS

| | | | | |
|---|---|---|---|---|
| 4,952,457 A | * | 8/1990 | Cartier et al. | ............ 428/425.6 |
| 6,187,845 B1 | * | 2/2001 | Renz et al. | ..................... 524/91 |
| 6,517,687 B1 | * | 2/2003 | Iacovangelo | ........... 204/192.26 |
| 2002/0150744 A1 | * | 10/2002 | Nagai | ......................... 428/215 |

FOREIGN PATENT DOCUMENTS

| | | |
|---|---|---|
| JP | 61-52093 B2 | 11/1986 |
| JP | 1036442 | 2/1989 |
| JP | 11-171604 A | 6/1999 |
| JP | 2000-281934 A | 10/2000 |
| JP | 2001-302289 | 10/2001 |
| JP | 2003-252655 A | 9/2003 |

OTHER PUBLICATIONS

Computer generated English translation of JP 11-171604, Jun. 29, 1999.
Computer generated English translation of JP 2003-252655, Sep. 10, 2003.
Computer generated English translation of JP 2000-281934, Oct. 10, 2000.
Partial English translation of JP S61-52093, Nov. 12, 1986.

* cited by examiner

*Primary Examiner*—D. S Nakarani
(74) *Attorney, Agent, or Firm*—Sughrue Mion, PLLC

(57) ABSTRACT

The present invention aims to provide an interlayer film for a laminate glass to obtain a laminate glass which is excellent in transparency, heat-shielding property, and electromagnetic wave transmittance even if the laminate glass is produced by sandwiching the interlayer film for a laminate glass with one pair of glasses, and which is not deteriorated in the visible light transmittance and the initial optical properties and is excellent in weathering-resistance after the test even if a durability test to light is run for the above-mentioned laminate glass.

17 Claims, No Drawings

INTERLAYER FILM FOR LAMINATE GLASS AND LAMINATE GLASS

TECHNICAL FIELD

The present invention relates to an interlayer film for a laminate glass which is excellent in transparency, heat-shielding property, and electromagnetic wave transmittance in the case of use for a laminate glass and is not deteriorated in the initial optical properties even after a light stability test and a laminate glass obtained by using the interlayer film for a laminate glass.

BACKGROUND ART

Since a laminate glass is scarcely scattered in debris even if being broken by receiving outside impact and is thus safe, the laminate glass has been used widely for a window glass of vehicles such as automobiles; aircrafts; buildings and the like. Examples of such a laminate glass are those which are obtained by inserting an interlayer film for a laminate glass comprising polyvinyl acetal resin such as polyvinyl butyral resin plasticized by a plasticizer between at least one pair of glasses and uniting such a film with glasses.

Although the laminate glass using such an interlayer film for a laminate glass is excellent in safety, it has a disadvantageous point that it is inferior in heat-shielding property. Generally, infrared ray (IR) with wavelength at shortest 780 nm, which is longer than that of visible light, among the light rays, has energy dose as low as about 10% of that of ultraviolet (UV) ray but has a significant thermal effect and if once absorbed in a substance, IR is released in form of heat to result in temperature increase and therefore, it is called as thermal beam. Accordingly, among light rays coming in through a front glass or side glass of an automobile, if IR having significant thermal effect is shielded, the heat-shielding effect is increased and the temperature increase in the inside of the automobile can be suppressed.

As such a glass which shields IR having significant thermal effect, for example, a heat ray-cutting glass has been commercialized. The heat ray-cutting glass is developed aiming to shield direct sun lights and obtained by forming a multilayer coating of metal/metal oxide on the surface of a glass plate by metal evaporation, sputtering or the like. However, such a multilayer coating is susceptive of scratching from the outside and inferior in chemical resistance, so that a method of obtaining the laminate glass laminating an interlayer film of a plasticized polyvinyl butyral resin film or the like has been employed.

However, the heat ray-cutting glass has problems that the glass is expensive, deteriorated in the transparency (visible light transmittance) because of thick thickness of the multilayer coating, and highly colorized because of absorption in a visible light region. Further, there are other problems that the adhesion between the multilayer coating and the interlayer film is decreased to cause separation and whitening of the interlayer film and that the multilayer coating layer inhibits transmittance of electromagnetic wave and interferes with communication functions of a mobile phone, a car navigation system, a garage opener, an electronic toll collection system, and the like.

For example, Patent Document No. 1 and Patent Document No. 2 proposes a laminate glass obtained by inserting a polyester film on which a thin film of a metal and/or metal oxide is formed or evaporated between plasticized polyvinyl butyral resin sheets. However, these laminate glasses have a problem in the adhesion between the plasticized polyvinyl butyral resin sheets and the polyester film to result in not only separation in the interfaces but also insufficiency of electromagnetic wave transmittance.

Further, Patent Document No. 3 discloses a method of obtaining electromagnetic wave transmittance by dispersing a metal oxide having heat-shielding property in the interlayer film. However the laminate glass comprising such an interlayer film for a laminate glass obtained by the described method has a problem that the laminate glass is discolored to be yellow to decrease the visible light transmittance after a durability test to light in some cases and thus it is expected that the laminate glass is scarcely allowed for use as an automotive front glass whose visible light transmittance is regulated in the lower limit.

Patent Document No. 1: Japanese Kokoku Publication Sho-61-52093

Patent Document No. 2: Japanese Kokai Publication Sho-64-36442

Patent Document No. 3: Japanese Kokai Publication 2001-302289

DISCLOSURE OF THE INVENTION

Problems which the Invention is to Solve

In view of the above-mentioned state of the art, the present invention aims to provide an interlayer film for a laminate glass which is excellent in transparency, heat-shielding property, and electromagnetic wave transmittance in the case of use for a laminate glass and is not deteriorated in the visible light transmittance and the initial optical properties even after a durability test to light and provide a laminate glass comprising the interlayer film for a laminate glass.

Means for Solving the Object

The present invention is directed to an interlayer film for a laminate glass which comprises at least each one layer of a heat-shielding layer and an UV-shielding layer.

Hereinafter, the present invention will be described in detail.

An interlayer film for a laminate glass of the present invention comprises at least each one layer of a heat-shielding layer and an UV-shielding layer.

On the basis of results of intensive-investigations, inventors of the present invention have found that a cause of decrease of visible light transmittance of a laminate glass comprising an interlayer film containing a heat-shielding metal oxide dispersed therein after a durability test to light is attributed to the chemical change of the metal oxide itself by UV rays and the resin matrix affected by the chemical change.

That is, it is supposed that when light directly comes in from outside, the heat-shielding layer of the interlayer film for a laminate glass of the present invention is discolored to cause decrease of the visible light transmittance owing to the light with a wavelength in UV region having a high energy.

However, since the interlayer film for a laminate glass of the present invention comprises the above-mentioned UV-shielding layer having a function of shielding the UV rays, UV rays of the light coming in the above-mentioned heat-shielding layer from the UV-shielding layer side are considerably decreased and thus the discoloration of the above-mentioned heat-shielding layer by UV rays can be suppressed. Accordingly, the laminate glass obtained using the interlayer film for a laminate glass of the present invention is suppressed from decrease of the visible light transmittance after the durability test to light and is not deteriorated in the initial optical qualities.

The interlayer film for a laminate glass of the present invention is preferable to comprise three layers composed of at least a heat-shielding layer and UV-shielding layers formed on both faces of the above-mentioned heat-shielding layer. With respect to the interlayer film for a laminate glass with such a structure, even if light comes in from both sides of the heat-shielding layer, the light comes in while being transmitted through the above-mentioned UV-shielding layers, UV rays are considerably decreased and thus discoloration of the above-mentioned heat-shielding layer to be yellow can be prevented. Accordingly, the visible light transmittance is not decreased even after the durability test to light and the initial optical qualities are not deteriorated in the case where the interlayer film for a laminate glass with the above-mentioned structure is used to obtain a laminate glass.

With respect to the interlayer film for a laminate glass of the present invention, the above-mentioned heat-shielding layer is preferable to have an electromagnetic wave shield capability of 10 dB or lower at a frequency of 0.1 MHz to 26.5 GHz in the case where the heat-shielding layer is inserted between two plates of glasses selected from a group consisting of clear glasses, green glasses, high heat ray absorption glasses, and UV absorption glasses to obtain a laminate glass. If it exceeds 10 dB, the electromagnetic wave transmittance of the laminate glass comprising the interlayer film for a laminate glass of the present invention may be decreased in some cases.

The above-mentioned heat-shielding layer is preferable to have a haze of 1.0% or less in form of the above-mentioned laminate glass. If it exceeds 1.0%, the transparency of the laminate glass comprising the interlayer film for a laminate glass of the present invention may be so low as to cause adverse effects on practical use in some cases.

The above-mentioned heat-shielding layer inserted in the above-mentioned laminate glass is preferable to have a visible light transmittance of 70% or higher. If it is lower than 70%, the transparency of the laminate glass comprising the interlayer film for laminate glass of the present invention may be so low as to cause adverse effects on practical use in some cases. The above-mentioned visible light transmittance may be measured, for example, by measuring visible light transmittance (Tv) of the laminate glass to the light rays with wavelength of 380 to 780 nm according to [Testing method on transmittance, reflectance and emittance of flat glasses and evaluation of solar heat gain coefficient] of JIS R 3106 (1998) by a recording spectrophotometer (manufactured by Hitachi Ltd., U 4000).

The above-mentioned heat-shielding layer inserted in the above-mentioned laminate glass is preferable to have a sun light transmittance 85% or lower of the above-mentioned visible light transmittance in a wavelength region of 300 to 2100 nm. If it exceeds 85%, the heat-shielding property of the laminate glass comprising the interlayer film for a laminate glass of the present invention is sometimes insufficient. The above-mentioned sun light transmittance may be measured, for example, by measuring sun light transmittance (Ts) of the laminate glass to the light rays with wavelength of 300 to 2100 nm according to [Testing method on transmittance, reflectance and emittance of flat glasses and evaluation of solar heat gain coefficient] of JIS R 3106 (1998) by a recording spectrophotometer (manufactured by Hitachi Ltd., U 4000).

The above-mentioned heat-shielding layer is preferable to contain a transparent resin and a heat-shielding agent.

The above-mentioned transparent resin is not particularly limited and, for example, resins known as transparent resins for interlayer films for a laminate glass can be exemplified. Practical examples of the resin are polyvinyl acetal resin; polyurethane resin; ethylene-vinyl acetate resin; acrylic copolymer resin comprising acrylic acid, methacrylic acid, or their derivatives as composing units; and vinyl chloride-ethylene-glycidyl methacrylate copolymer resin. These resins can be produced easily by known methods or so.

As the above-mentioned transparent resin, polyvinyl acetal resin is preferable. The above-mentioned polyvinyl acetal resin is not particularly limited if it is obtained by acetalization of polyvinyl alcohol with an aldehyde. As the above-mentioned polyvinyl alcohol, a polyvinyl alcohol obtained by saponification of poly(vinyl acetate) and having a saponification degree of 80 to 99.8% by mole may generally be used.

In the case where the above-mentioned polyacetal resin is used for the present invention, the molecular weight and molecular weight distribution are not particularly limited, however in terms of the formability and physical properties, the lower limit of the polymerization degree of the polyvinyl alcohol resin to be a raw material is preferably 200 and the upper limit is preferably 3,000. If it is lower than 200, the resistance to penetration of the laminate glass to be obtained tends to be decreased and if it exceeds 3,000, the formability of the resin film tends to be worsened and the toughness of the resin film tend to be too high, resulting in inferior processibility. The lower limit is more preferably 500 and the upper limit is more preferably 2,000.

As the above-mentioned aldehyde, aldehydes with 1 to 10 carbon atoms may be used and examples of such aldehydes are n-butylaldehyde, isobutylaldehyde, n-varelaldehyde, 2-ethylbutylaldehyde, n-hexylaldehyde, n-octylaldehyde, n-nonylaldehyde, n-decylaldehyde, formaldehyde, acetaldehyde, and benzaldehyde. Among them, n-butylaldehyde, n-hexylaldehyde, and n-varelaldehyde are preferable and butylaldehyde with 4 carbon atoms is particularly preferable.

As the above-mentioned polyvinyl acetal, polyvinyl butyral obtained by acetalization with butylaldehyde is preferable. Further, these acetal resins may be properly combined and blended on consideration of the required physical properties. Further, co-polyvinyl acetal resin obtained by combining aldehyde at the time of acetalization may be used properly. The lower limit of the acetalization degree of the above-mentioned polyvinyl acetal resin to be used for the present invention is preferably 40% and the upper limit is 85%, and the lower limit is more preferably 60% and the upper limit is more preferably 75%.

The above-mentioned heat-shielding layer is preferable to contain a plasticizer.

As the above-mentioned plasticizer, any plasticizer to be used commonly for the interlayer film for a laminate glass may be used without any particular limit and examples of the plasticizer are organic type plasticizers such as monobasic organic acid esters, polybasic organic acid esters; and organophosphoric acid type plasticizers such as organophosphoric acid type, organophosphorous acid type ones. These plasticizers may be used alone or two or more of them may be used in combination and on consideration of the compatibility with the above-mentioned transparent resin, these plasticizers are properly used depending on the types of the resin.

The above-mentioned monobasic organic acid ester type plasticizers are not particularly limited and examples thereof may include glycol type esters obtained by reaction of glycols such as triethylene glycol, tetraethylene glycol, tripropylene glycol or the like and a monobasic organic acid such as butyric acid, isobutyric acid, caproic acid, 2-ethylbutyric acid, heptylic acid, n-octylic acid, 2-ethylhexylic acid, pelargonic acid (n-nonylic acid), or decylic acid. Among them, triethylene glycol monobasic organic acid esters such as triethylene glycol dicaproic acid ester, triethylene glycol di-2-ethylbutyric acid ester, triethylene glycol di-n-octylic acid ester, and triethylene glycol di-2-ethylhexylic acid ester are preferable to be used.

The above-mentioned polybasic organic ester type plasticizers are not particularly limited and examples thereof may include esters of polybasic organic acids such as adipic acid, sebacic acid, or azelaic acid and straight chain or branched alcohols with 4 to 8 carbon atoms. Among them, dibutyl sebacic acid ester, dioctyl azelaic acid ester, dibutylcarbitol adipic acid ester are preferable to be used.

The above-mentioned organic phosphoric acid type plasticizers are not particularly limited and examples thereof may include tributoxyethyl phosphate, isodecylphenyl phosphate, triisopropyl phosphate and the like.

Practical examples of the above-mentioned plasticizers are triethylene glycol diethylbutyrate, triethylene glycol diethylhexoate, triethylene glycol dibutylsebacate and the like.

In the above-mentioned heat-shielding layer, the addition amount of the above-mentioned plasticizers is not particularly limited and for example, in the case where the above-mentioned transparent resin is polyvinyl acetal resin, the lower limit is preferably 20 parts by weight and the upper limit is preferably 100 parts by weight to 100 parts by weight of the polyvinyl acetal resin. If it is less than 20 parts by weight, the resistance to penetration is sometimes decreased and if it exceeds 100 parts by weight, bleeding out of the plasticizers probably occurs to lead to deterioration of the transparency and adhesion of the heat-shielding layer and significant optical distortion of the laminate glass to be obtained. The lower limit is more preferably 30 parts by weight and the upper limit is more preferably 60 parts by weight.

The above-mentioned heat-shielding layer is preferable to contain an adhesion adjustment agent.

The above-mentioned adhesion adjustment agent is not particularly limited and an alkali metal salt and/or an alkaline earth metal salt is preferable to be used. As the above-mentioned alkali metal salt and/or the alkaline earth metal salt is not particularly limited and examples thereof are salts of potassium, sodium, magnesium, and the like. An acid forming the above-mentioned salt is not particularly limited and examples of the acid include organic acids, for example, carboxylic acids such as octylic acid, hexylic acid, butyric acid, acetic acid, and formic acid and inorganic acids such as hydrochloric acid, nitric acid.

Among the above-mentioned alkali metal salts and/or alkaline earth metal salts, alkali metal salts and alkaline earth metal salts of organic acids having 2 to 16 carbon atoms are more preferable and magnesium carboxylate having 2 to 16 carbon atoms and potassium carboxylate having 2 to 16 carbon atoms are further preferable.

The above-mentioned magnesium carboxylate or potassium carboxylate of organic acids having 2 to 16 carbon atoms is not particularly limited and for example, magnesium acetate, potassium acetate, magnesium propionate, potassium propionate, magnesium 2-ethylbutanate, potassium 2-ethylbutanate, magnesium 2-ethylhexanate, and potassium 2-ethylhexanate are preferable to be used. These salts may be used alone or two or more of them are used in combination.

The addition amount of the above-mentioned alkali metal salt and/or alkaline earth metal salt is not particularly limited in the above-mentioned heat-shielding layer and for example, in the case where the above-mentioned transparent resin is polyvinyl acetal resin, the lower limit of the addition amount is 0.001 parts by weight and the upper limit is 1.0 part by weight to 100 parts by weight of the polyvinyl acetal resin. If it is less than 0.001 parts by weight, the adhesion strength may possibly be decreased in the circumferential part of the interlayer film in highly humid atmosphere and if it exceeds 1.0 part by weight, the adhesion strength becomes too low and the transparency of the interlayer film is lost in some cases. The lower limit is more preferably 0.01 parts by weight and the upper limit is more preferably 0.2 parts by weight.

The above-mentioned heat-shielding agent is not particularly limited if it is a substance capable of giving heat-shielding property to the heat-shielding layer and for example, tin-dope indium oxide fine particles (hereinafter, referred to as ITO fine particles) are preferable to be used.

The above-mentioned ITO fine particles are preferable to be finely and evenly dispersed in the above-mentioned heat-shielding layer so as to sufficiently exhibit the effect. Practically, to be finely and evenly dispersed means the state that the ITO fine particles are dispersed without causing agglomeration to the extent that the transparency decrease owing to ITO fine particle addition cannot be confirmed in the case of observation of the above-mentioned heat-shielding layer with eyes, in other words, to the extent that light scattering by the ITO fine particles scarcely takes place in the visible light region.

More particularly, the above-mentioned ITO fine particles are preferable to have an average particle diameter of 80 nm or smaller. If the average particle diameter exceeds 80 nm, the visible light scattering by the ITO fine particles becomes significant and the transparency of the interlayer film for a laminate glass of the present invention to be obtained may possibly be deteriorated. As a result, in the case of using the film for a laminate glass, the haze may be worsened and, for example, highly advanced transparency required for an automotive front glass or the like cannot be obtained.

The above-mentioned ITO fine particles are preferable to be dispersed so as to satisfy one or less particle with a particle diameter of 100 nm or larger per 1 $\mu m^2$. It means the dispersion state that in the case where the above-mentioned heat-shielding layer is photographed and observed by a transmission electron microscope, no ITO fine particle with a particle diameter of 100 nm or larger is observed or when ITO fine particles with a particle diameter of 100 nm or larger are observed and if one ITO fine particle with a particle diameter of 100 nm or larger is set in the center of a frame of 1 $\mu m^2$, no other ITO particle with a particle diameter of 100 nm or large is observed within the frame. Accordingly, if the interlayer film for a laminate glass of the present invention is used for a laminate glass, the laminate glass is provided with a low haze and is excellent in transparency and the entire interlayer film for a laminate glass of the present invention is provided with high heat-shielding property. The observation with the transmission electron microscope may be carried out, for example, at an acceleration voltage of 100 kV by employing H-7100 FA model transmission electron microscope manufactured by Hitachi Ltd.

The addition amount of the above-mentioned ITO fine particles in the above-mentioned heat-shielding layer is not particularly limited and for example, in the case where the transparent resin is polyvinyl acetal resin, the lower limit is preferably 0.1 parts by weight and the upper limit is preferably 3.0 parts by weight to 100 parts by weight of the polyvinyl acetal resin. If it is less than 0.1 parts by weight, no sufficient IR cutting effect may be obtained and if it exceeds 3.0 parts by weight, the transparency to the visible light is decreased and the haze is increased in some cases.

In general, the above-mentioned ITO fine particles are evenly dispersed in an organic solvent and then added to the above-mentioned polyvinyl acetal resin to finely disperse the particles in the above-mentioned polyvinyl acetal resin, and it is preferable that a plasticizer of a similar type to that of the above-mentioned plasticizer to be used for the plasticization of the above-mentioned polyvinyl acetal resin is used as a main dispersant for the even dispersion.

The heat-shielding layer is preferable to further contain a dispersion stabilizer.

As the above-mentioned dispersion stabilizer, for example, a coordination compound comprising at least one kind of atom selected from group consisting of nitrogen, phosphorus, and chalcogen type atom group as a coordinating atom of ITO is preferable. Such the coordination compound is not particularly limited and examples of the coordination compound are anionic surfactants such as carboxylate salts, sulfonic acid salts, sulfuric acid ester salts, phosphoric acid ester salts, polymer type macromolecules, and condensate polymer type macromolecules; nonionic surfactants such as ethers, esters, ester ethers, and nitrogen-containing compounds; cationic surfactants such as primary to tertiary amine salts, quaternary ammonium salts, and polyethylene polyamine derivatives; and amphoteric surfactants such as carboxybetaine, aminocarboxylic acid salts, sulfobetaine, aminosulfuric acid esters, and imidazoline. Among them, at least one selected from a group consisting of sulfuric acid type ester compounds, phosphoric acid ester type compounds, ricinoleic acid, polyricinoleic acid, polycarboxylic acid, polyhydric alcohol type surfactants, polyvinyl alcohol, and polyvinyl butyral is particularly preferable to be used since it can efficiently prevent agglomeration of the ITO fine particles.

The addition amount of the above-mentioned dispersion stabilizer is not particularly limited and for example, in the case where the transparent resin is polyvinyl acetal resin, the lower limit is preferably 0.001 parts by weight and the upper limit is preferably 5.0 parts by weight to 100 parts by weight of polyvinyl acetal resin. If it is less than 0.001 parts by weight, the effect of the dispersion stabilizer is scarcely obtained. If it exceeds 5.0 parts by weight, foaming occurs at the time of the interlayer film formation or foaming occurs and the adhesion strength between the interlayer film and a glass becomes too high in the case of a laminate glass formation. The lower limit is more preferably 0.05 parts by weight and the upper limit is more preferably 1.0 part by weight, to 1.0 part by weight of the ITO fine particles.

With respect to the above-mentioned heat-shielding layer, the haze can be improved further by adding a chelating agent and a compound having at least one carboxyl group to the main dispersant. In this case, the chelating agent and the compound having at least one carboxyl group may be mixed with the main dispersant or added separately to the polyvinyl acetal resin without being mixed with the main dispersant.

The above-mentioned chelating agent is not particularly limited and EDTAs and β-diketones such as acetylacetone, benzoyltrifluoroacetone, dipivaloylmethane can be exemplified and those having good compatibility with the plasticizer and polyvinyl acetal resin are preferable. Among them, the above-mentioned β-diketones are preferable and particularly acetylacetone is preferable. The effect of addition of these chelating agents is considered that the agents are coordinated with the above-mentioned ITO fine particles and therefore, the ITO fine particles are prevented from agglomeration to result in good dispersion state and improvement of the haze.

The addition amount of the above-mentioned chelating agent is not particularly limited and for example, in the case where the above-mentioned transparent resin is polyvinyl acetal resin, the lower limit is preferably 0.001 parts by weight and the upper limit is preferably 2 parts by weight to 100 parts by weight of polyvinyl acetal resin. If it is less than 0.001 parts by weight, the effect of the addition is scarcely expected and if it exceeds 2 parts by weight, foaming may occur at the time of film formation or foaming may occur at the time of a laminate glass production. The lower limit is more preferably 0.01 parts by weight and the upper limit is more preferably 1 part by weight.

The above-mentioned compound having one or more carboxyl groups is not particularly limited and for example, aliphatic carboxylic acids, aliphatic dicarboxylic acids, aromatic carboxylic acids, aromatic dicarboxylic acids, and hydroxyacids can be exemplified. Practically, benzoic acid, phthalic acid, salicylic acid, ricinoleic acid or the like may be used. Among them, aliphatic $C_2$ to $C_{18}$ carboxylic acids are preferably used and aliphatic $C_2$ to $C_{10}$ carboxylic acids are even more preferably used. Practically, acetic acid, propionic acid, n-butyric acid, 2-ethylbutyric acid, n-hexanoic acid, 2-ethylhexanoic acid, and n-octanoic acid can be exemplified.

The addition amount of the above-mentioned compound having one ore more carboxylic groups is not particularly limited and for example, in the case where the above-mentioned transparent resin is polyvinyl acetal resin, the lower limit is preferably 0.001 parts by weight and the upper limit is preferably 2 parts by weight to 100 parts by weight of polyvinyl acetal resin. If it is less than 0.001 parts by weight, the effect of the addition is scarcely expected and if it exceeds 2 parts by weight, discoloration of the heat-shielding layer may possibly occur and the adhesion strength of a glass and heat-shielding layer may be decreased. The lower limit is more preferably 0.01 parts by weight and the upper limit is more preferably 1 part by weight.

The above-mentioned heat-shielding layer is preferable to contain an antioxidant.

The above-mentioned antioxidant is not particularly limited and for example, as a phenol type, 2,6-di-tert-butyl-p-cresol (BHT) (manufactured by Sumitomo Chemical Co., Ltd., Sumilizer BHT), tetrakis-[methylene-3-(3',5'-di-tert-butyl-4'-hydroxyphenyl)propionate]methane (manufactured by Ciba-Geigy Corp., Irganox 1010) can be exemplified. These antioxidants may be used alone or two or more of them can be used in combination.

The addition amount of the above-mentioned antioxidant is not particularly limited and for example, in the case where the above-mentioned transparent resin is polyvinyl acetal resin, the lower limit is preferably 0.01 parts by weight and the upper limit is preferably 5.0 parts by weight to 100 parts by weight of polyvinyl acetal resin. If it is less than 0.01 parts by weight, the oxidation prevention effect is scarcely expected and if it exceeds 5.0 parts by weight, foaming may occur at the time of film formation of interlayer film or foaming may occur at the time of a laminate glass production.

In the interlayer film for a laminate glass of the present invention, the above-mentioned UV shielding layer is preferable to have an UV transmittance of 60% or lower measured in accordance with SAE J1796 in the case where the UV-shielding layer is inserted between two plates of glasses selected from a group consisting of clear glasses, green glasses, high heat ray absorption glasses, and UV absorption glasses to obtain a laminate glass. If it exceeds 60%, the visible light transmittance is decreased after a durable test to light in the case of a laminate glass comprising the UV-shielding layer and the laminate glass cannot be used for an automotive front glass whose visible light transmittance has an allowable lower limit and may not be used practically. It is more preferably 30% or lower and even more preferably 10% or lower.

The above-mentioned UV-shielding layer is preferable to contain transparent resin and an UV-cutting agent.

The above-mentioned transparent resin is not particularly limited and for example, those similar to the transparent resin for the above-mentioned heat-shielding layer can be exemplified.

The above-mentioned UV-cutting agent is preferably at least one UV absorbent selected from a group consisting of metal type, metal oxide type, benzotriazole type, benzophenone type, triazine type, benzoate type, malonic acid ester type, and oxalic acid anilide type ones. These UV absorbents may be used alone or two or more of them are used in combination.

The above-mentioned metal type UV absorbent is not particularly limited and examples of the agent include platinum ultrafine particles, fine particles obtained by coating the surface of platinum ultrafine particles with silica, palladium ultrafine particles, and fine particles obtained by coating the surface of palladium ultrafine particles with silica.

The above-mentioned metal oxide type UV absorbent is not particularly limited and examples of the agent include zinc oxide and/or titanium oxide, cerium oxide and the like. Among them, zinc oxide and/or titanium oxide is preferable.

The above-mentioned metal oxide type UV absorbent is preferably coated with an insulating metal oxide on the surface so as to suppress deterioration of the interlayer film for a laminate glass of the present invention. The above-mentioned insulating metal oxide is not particularly limited and for example, those having a band gap energy of 5.0 eV or higher such as silica, alumina, and zirconia are exemplified and among them, silica is preferable to be used.

As above-mentioned the metal oxide type UV absorbent coated with silica, usable examples thereof may be those which are commonly commercialized and those which are obtained by treating the above-mentioned metal oxide type UV absorbent with a reagent capable of forming a silica layer on the surface by reaction with the surface of the agent. The above-mentioned reagent capable of forming a silica layer on the surface is not particularly limited and for example, tetraethoxysilane, silicon chloride or the like can be exemplified.

Further, the above-mentioned metal oxide type UV absorbent is preferable to be coated with a hydrolyzable organosilicon compound on the surface.

As the metal oxide type UV absorbent coated with the hydrolyzable organosilicon compound on the surface, usable examples thereof may include those which are commonly commercialized and those which are obtained by treating the surface of the above-mentioned metal oxide type UV absorbent with a silane coupling agent.

Further, the above-mentioned metal oxide type UV absorbent is preferable to be coated with a silicone type compound on the surface.

As the metal oxide type UV absorbent coated with the silicone type compound on the surface, usable examples thereof may include those which are commonly commercialized and those which are obtained by treating the surface of the above-mentioned metal oxide type UV absorbent with Methicon, Dimethicon and the like.

As the above-mentioned benzotriazole type UV absorbent, examples thereof include benzotriazole type ones such as 2-(2'-hydroxy-5'-methylphenyl)benzotriazole (manufactured by Ciba-Geigy Corp., Tinuvin P), 2-(2'-hydroxy-3',5'-di-tert-butylphenyl)benzotriazole (manufactured by Ciba-Geigy Corp., Tinuvin 320), 2-(2'-hydroxy-3'-tert-butyl-5'-methylphenyl)-5-chlorobenzotriazole (manufactured by Ciba-Geigy Corp., Tinuvin 326), and 2-(2'-hydroxy-3',5'-di-amylphenyl)benzotriazole (manufactured by Ciba-Geigy Corp., Tinuvin 328); and hindered amine type ones such as LA-57 manufactured by Adeka Argus Chemical Co., Ltd.

As the above-mentioned benzophenone type UV absorbent, examples thereof may include octabenzone (manufactured by Ciba-Geigy Corp., Chimassorb 81).

As the above-mentioned triazine type UV absorbent, examples thereof may include 2-(4,6-diphenyl-1,3,5-triazin-2-yl)-5-[(hexyl)oxy]-phenol (manufactured by Ciba-Geigy Corp., Tinuvin 1577 FF).

As the above-mentioned benzoate type UV absorbent, examples thereof may include 2,4-di-tert-butylphenyl-3,5-di-tert-butyl-4-hydroxybenzoate (manufactured by Ciba-Geigy Corp., Tinuvin 120).

As the above-mentioned malonic acid ester type UV absorbent, commercialized examples thereof may include propanedioic acid, [(4-methoxyphenyl)-methylene]-dimethyl ester (manufactured by Clariant Inc., Hostavin PR-25).

As the above-mentioned oxalic acid anilide type UV absorbent, commercialized examples thereof may include 2-ethyl-2'-ethoxyoxyanilide (manufactured by Clariant Inc., Sanduvor VSU).

The above-mentioned malonic acid ester type and oxalic acid anilide type UV absorbents have an UV absorption region in UV-B and in consideration of that the wavelength of UV rays causing deterioration of various transparent resins is in 300 to 320 nm, it can be said that these agents are suitable UV absorbents for protection of the resins from UV rays. Further, since the molar absorption is extremely high, as compared with a conventionally known UV absorbent, the UV absorption amount for the same addition amount is much higher and further since the molecular weight is low, the addition amount can be saved to result in cost down.

As the above-mentioned UV-cutting agent, use of the above-mentioned malonic acid ester type and/or oxalic acid anilide type UV absorbent can keep the decrease of visible light transmittance of the interlayer film for a laminate glass of the present invention in a prescribed range or lower after the durability test to light, which will be described later.

The addition amount of the above-mentioned UV-cutting agent is not particularly limited and the lower limit is preferably 0.01 parts by weight and the upper limit is preferably 5.0 parts by weight to 100 parts by weight of the transparent resin. If it is less than 0.01 parts by weight, the UV absorption effect is scarcely obtained and if it exceeds 5.0 parts by weight, a problem of weathering-resistance deterioration of the resin may occur in some cases. The lower limit is more preferably 0.05 parts by weight and the upper limit is more preferably 1.0 part by weight.

The above-mentioned UV-shielding layer may further contain, for example, an antioxidant and various types of photostabilizers as other additives to prevent deterioration by heat in an extruder. Further, based on the necessity, modified silicone oil and a surfactant as an adhesion strength adjustment agent, a flame retarding agent, an antistatic agent, an adhesion strength adjustment agent, a moisture resistance agent, a heat ray reflecting agent, and a heat ray absorbent may be added as additives.

The above-mentioned photostabilizers are not particularly limited and may include hindered amine type ones, for example, Adeka Stab LA-57 manufactured by Asahi Denka Co., Ltd.

The above-mentioned modified silicone oil is not particularly limited and may include, for example, epoxy-modified silicone oil, ether-modified silicone oil, ester-modified silicone oil, amine-modified silicone oil, and carboxyl-modified silicone oil disclosed in Japanese Kokoku Publication Sho-55-29950. These modified silicon oils are generally liquids obtained by reaction of polysiloxanes with compounds for modification. The above-mentioned modified silicone oils may be used alone and two or more of them are used in combination.

The lower limit of the molecular weight of the above-mentioned modified silicone oil is preferably 800 and the upper limit is preferably 5,000. If it is lower than 800, the localization on the surface is sometimes lowered and if it exceeds 5,000, the compatibility with the resin becomes inferior to result in bleeding out of the oil to the film surface and decrease of adhesion strength to the glass. The lower limit is more preferably 1,500 and the upper limit is more preferably 4,000.

The addition amount of the modified silicone oil is not particularly limited and, for example, in the case where the above-mentioned transparent resin is polyvinyl acetal resin, the lower limit is preferably 0.01 parts by weight and the upper limit is preferably 0.2 parts by weight to 100 parts by weight of the polyvinyl acetal resin. If it is less than 0.01 parts by weight, the effect for preventing whitening owing to moisture absorption is scarcely obtained and if it exceeds 0.2 parts by weight, compatibility with the resin becomes inferior to result in bleeding out of the oil to the film surface and decrease of adhesion strength to the glass. The lower limit is more preferably 0.03 parts by weight and the upper limit is more preferably 0.1 parts by weight.

The above-mentioned surfactant is not particularly limited and, for example, sodium laurate and alkylbenzenesulfonic acid can be exemplified.

The interlayer film for a laminate glass of the present invention comprising at least each one layer of such heat-shielding layer and UV-shielding layer is that a visible light transmittance decrease is preferably 1.0% or lower measured in accordance with JIS Z 8722 and JIS R 3106 (1998) after the interlayer film is inserted between two plates of glasses selected from a group consisting of clear glasses, green glasses, high heat ray absorption glasses, and UV absorption glasses to obtain a laminate glass; and Super Xenon 100-hours radiation test is run for the laminate glass. If it exceeds 1.0%, the visible light transmittance decrease after the durability test to light is too significant and it results in a problem for practical use.

Further, the interlayer film for a laminate glass of the present invention comprising at least each one layer of such heat-shielding layer and UV-shielding layer is that a visible light transmittance decrease is preferably 3.0% or lower measured in accordance with JIS Z 8722 and JIS R 3106 (1998) after the interlayer film is inserted between two plates of glasses selected from a group consisting of clear glasses, green glasses, high heat ray absorption glasses, and UV absorption glasses to obtain a laminate glass; and Super UV 300-hours radiation test is run for the laminate glass. If it exceeds 3.0%, the visible light transmittance decrease after the durability test to light is too significant and it results in a problem for practical use. The upper limit is more preferably 2.0% and even more preferably 1.0%.

Further, in the case where a laminate glass is produced using the interlayer film for a laminate glass of the present invention, the increase ratio of yellow index (YI) and the alteration ratio of b* value of CIE color system are preferable to be low after the Super Xenon 100-hours radiation test and Super UV 300-hours radiation test. If the alteration ratios of the yellow index (YI) and the b* value of CIE color system are higher, the heat-shielding agent of such as ITO fine particles and/or the transparent resin contained in the above-mentioned heat-shielding layer is considerably deteriorated and the optical properties, mechanical properties, and physical properties of the interlayer film for a laminate glass of the present invention cannot be sometimes maintained after the above-mentioned test.

The thickness of the interlayer film for a laminate glass of the present invention is not particularly limited and in terms of the lowest limits of needed penetration resistance and weathering-resistance, the lower limit is preferably 0.3 mm and the upper limit is preferably 0.8 mm. Based on the necessity of improvement of the penetration resistance or the like, the interlayer film for a laminate glass of the present invention and an interlayer film for a laminate glass other than the former may be laminated for combination use.

A method of producing the interlayer film for a laminate glass of the present invention is not particularly limited and there are methods, for example, involving forming the above-mentioned heat-shielding layer and the UV-shielding layer in sheet-like form by conventional film formation method such as an extrusion method, a calender method, a press method and then laminating obtained sheets and a more preferable method is an extrusion method involving extrusion in biaxial direction and according to such a method, the haze of the interlayer film for a laminate glass to be obtained can further be improved.

The method for obtaining the above-mentioned heat-shielding layer is not particularly limited, however a method involving adding a dispersion containing the heat-shielding agent such as ITO fine particles evenly dispersed in an organic solvent to the transparent resin and then kneading the mixture may be generally employed.

The organic solvent for the above-mentioned dispersion is not particularly limited and a plasticizer of a similar type to the plasticizer to be used is preferable.

The apparatus to be used for mixing the ITO fine particles and the organic solvent is not particularly limited and, for example, a planetary type stirring apparatus, a wet mechanochemical apparatus, a Henshel mixer, a homogenizer, an ultrasonic radiation apparatus and the like is used commonly.

The apparatus to be used for kneading is not particularly limited and, for example, an extruder, a plastograph, a kneader, a Bumbury's mixer, a calender roll, or the like can be exemplified. Among them, in terms of continuous production, the extruder is preferable.

The method for obtaining the above-mentioned UV-shielding layer is not particularly limited and in general, a method of adding an UV-cutting agent in place of the heat-shielding agent of ITO fine particles and the like in the above-mentioned method for obtaining the heat-shielding layer may be employed.

Since the interlayer film for a laminate glass of the present invention comprises at least each one layer of the heat-shielding layer excellent in transparency, heat-shielding property, and electromagnetic wave transmittance and UV-shielding layer excellent in the UV-shielding efficiency, use of the interlayer film for a laminate glass of the present invention makes it possible to obtain a laminate glass excellent in transparency, heat-shielding property, and electromagnetic wave transmittance and scarcely deteriorated in the initial optical properties even after a light stability test.

The present invention also provides a laminate glass comprising the interlayer film for a laminate glass of the present invention.

With respect to the laminate glass of the present invention, in general, the interlayer film for a laminate glass of the present invention is preferable to be disposed in such a manner that the UV-shielding layer is in the outside light incident side in relation to the heat-shielding layer.

As described above, the weathering-resistance of the above-mentioned heat-shielding layer is rather considerably affected by the weathering-resistance of the heat-shielding agent such as ITO fine particles contained therein. Therefore, when the outside light rays directly enter in the above-mentioned heat-shielding layer, it may be considered that the heat-shielding agent such as above-mentioned ITO fine particles and the dispersion stabilizer causes chemical change owing to the light rays with wavelength in the UV wavelength region having high energy, and at the same time affects even the resin matrix in the peripheral parts to result in weathering-resistance decrease. Accordingly, arrangement of the above-mentioned UV-shielding layer in the outside light ray incident side in relation to the above-mentioned heat-shielding layer decreases the dose of the light rays with wavelength in the UV wavelength region which enter in the above-mentioned heat-shielding layer and thus prevents the weathering-resistance deterioration of the heat-shielding layer. As a result, deterioration of the weathering-resistance of the laminate glass of the present invention can be suppressed.

The glass to be used for the laminate glass of the present invention is not particularly limited and for example, commonly used a transparent plate glass can be exemplified. Particularly, a heat ray absorption glass with total transmittance of 65% or less in the wavelength region of 900 to 1,300 nm is preferable. It is because the IR-cutting property of the ITO fine particles is better in a wavelength region longer than 1,300 nm and relatively low in a wavelength region of 900 to 1,300 nm and accordingly, a combination of the interlayer film for a laminate glass of the present invention with the above-mentioned heat ray absorption glass can lower the solar radiation transmittance and increase the solar radiation cutting ratio for the same visible light transmittance as compared with a combination of the interlayer film with clear glasses.

The laminate glass of the present invention may include combination of the interlayer film for a laminate glass of the present invention and a plastic film. In particular, for example, combinations of the interlayer film for a laminate glass of the present invention with transparent plastic films of polycarbonates, poly(methyl methacrylate), and the like having no metal coating layer are exemplified. Such a laminate glass is obtained using the interlayer film for a laminate glass of the present invention and thus is excellent in transparency, heat-shielding property, and electromagnetic wave transmittance and scarcely causes deterioration of the initial optical properties even after the light stability test and additionally, since the laminate glass comprises the plastic film, the crime prevention and penetration properties can be improved.

Further, a rigid body other than a glass, for example, a metal, an inorganic material, or the like may be used as vibration suppressing material by laminating it on the interlayer film for a laminate glass of the present invention.

The laminate glass of the present invention can be used for an automotive front glass, a side glass, glass parts for vehicles such as aircrafts and trains, glasses for buildings, and the like. Further, as the interlayer film for a laminate glass, multilayer type interlayer film for a laminate glass having a multilayer structure can be used and for example, the multilayer type interlayer film for a laminate glass can be used as a multilayer type sound-insulating interlayer film for a laminate glass and a functional laminate glass.

EFFECT OF THE INVENTION

Since the interlayer film for a laminate glass of the present invention comprises at least each one layer of heat-shielding layers and UV-shielding layers, the interlayer film for a laminate glass is excellent in the transparency, the heat shielding property, and electromagnetic wave transmittance in the case of use for a laminate glass and scarcely causes visible light transmittance decrease even after a durable test to light and does not deteriorate the initial optical quality.

BEST MODE FOR CARRYING OUT THE INVENTION

Hereinafter, the present invention will be described in details with reference to examples, however the present invention is not limited to these examples.

EXAMPLE 1

(1) Synthesis of polyvinyl butyral 275 g of polyvinyl alcohol with an average polymerization degree of 1,700 and a saponification degree of 99.2% by mole was added to and dissolved in pure water 2,890 g by heating. The reaction system was adjusted to be at 15° C. and 201 g of hydrochloric acid with a concentration 35% by weight and 157 g of n-butylaldehyde were further added and kept at the same temperature to precipitate a reaction product. Next, the reaction system was kept at 60° C. for 3 hours to finish the reaction and then the reaction system was washed with an excess amount of water to wash out unreacted n-butylaldehyde and the hydrochloric acid catalyst was neutralized with an aqueous sodium hydroxide solution, a widely used neutralization agent, and further the reaction product was washed with excess water for 2 hours and dried to obtain a white powder state polyvinyl butyral resin. The polyvinyl butyral resin had an average butyralization degree of 68.5% by mole.

(2) Production of Plasticizer Mixed with UV-cutting Agent and Antioxidant

As an antioxidant, 0.8 parts by weight of 2,6-di-tert-butyl-p-cresol (BHT) (manufactured by Sumitomo Chemical Co., Ltd., Sumilizer BHT), and as an UV absorbent, 0.8 parts by weight of 2-(2'-hydroxy-3'-tert-butyl-5'-methylphenyl)-5-chlorobenzotriazole (manufactured by Ciba-Geigy Corp., Tinuvin 326), were added to 40 parts by weight of triethylene glycol di-ethylenebutylate (3GO) and stirred and mixed until the mixture became a uniform and transparent solution to obtain a plasticizer solution.

(3) Production of ITO-dispersed Plasticizer 1 part by weight of an ITO powder (manufactured by Mitsubishi Materials Corp.) was loaded to 40 parts by weight of the obtained plasticizer solution and using a polyphosphoric acid ester salt as a dispersant, the ITO fine particles are dispersed in the plasticizer by a horizontal microbeads mill.

After that, 0.2 parts by weight of acetylacetone was added to the solution while being stirred to obtain an ITO-dispersed plasticizer solution.

(4) Production of Heat-shielding Layer 41 parts by weight of the ITO-dispersed plasticizer solution was added to 100 parts by weight of the obtained polyvinyl butyral resin and magnesium 2-ethylbutyrate in a proper amount was added thereto so as to adjust the Mg content to be 60 ppm in the entire system and the resulting mixture was sufficiently melted and kneaded by a mixing roll and press-molded at 150° C. for 30 minutes by employing a press molding apparatus to obtain a heat-shielding layer (A) with an average film thickness of 0.76 mm.

(5) Production of UV-shielding Layer 40 parts by weight of the plasticizer solution was added to 100 parts by weight of the obtained polyvinyl butyral resin and magnesium 2-ethylbutyrate in a proper amount was added thereto so as to adjust the Mg content to be 60 ppm in the entire system and the resulting mixture was sufficiently melted and kneaded by a mixing roll and press-molded at 150° C. for 30 minutes by employing a press molding apparatus to obtain a UV-shielding layer (A) with an average film thickness of 0.76 mm.

(6) Production of Laminate Glass

An interlayer film for a laminate glass with two-layer structure obtained by laminating each one layer of obtained heat-shielding layer (A) and UV-shielding layer (A) was sandwiched by setting transparent float glass plates (length 30 cm×width 30 cm×thickness 2.5 mm) from both ends and the laminate body was put in a rubber bag and degassed at 2660 Pa (20 torr) vacuum degree for 20 minutes and then the laminate body was transferred to an oven while being degassed and kept at 90° C. for 30 minutes and vacuum-pressed. The laminate glass preliminarily press-bonded in such a manner was pressure bonded under the condition of 135° C. and pressure of 1.2 MPa (12 kg/cm$^2$) for 20 minutes in an autoclave to obtain a laminate glass.

EXAMPLE 2

A heat-shielding layer (B) was produced in the same manner as Example 1, except that 2 parts by weight of ITO powder (manufactured by Mitsubishi Materials Corp.) was loaded to 40 parts by weight of the plasticizer obtained in the ITO-dispersed plasticizer production and the average film thickness of the heat-shielding layer was changed to be 0.38 mm.

A laminate glass was obtained in the same manner as Example 1, except that the heat-shielding layer (B) and the UV-shielding layer (A) produced in the same manner as Example 1 were used.

EXAMPLE 3

A heat-shielding layer (B) was produced in the same manner as Example 1, except that 0.2 parts by weight of 2,6-di-tert-butyl-p-cresol (BHT) (manufactured by Sumitomo Chemical Co., Ltd., Sumilizer BHT) was used as an antioxidant and 0.2 parts by weight of 2-(2'-hydroxy-3'-tert-butyl-5'-methylphenyl)-5-chlorobenzotriazole (manufactured by Ciba-Geigy Corp., Tinuvin 326), was used as an UV-absorbent in the production of the UV-shielding layer.

A laminate glass was obtained in the same manner as Example 1, except that the heat-shielding layer (A) produced in the same manner as Example 1 and the UV-shielding layer (B) were used.

EXAMPLE 4

A laminate glass was obtained in the same manner as Example 1, except that the heat-shielding layer (B) produced in the same manner as Example 2 and the UV-shielding layer (B) produced in the same manner as Example 3 were used.

EXAMPLE 5

A laminate glass was obtained in the same manner as Example 1, except that the interlayer film for a laminate glass with a three-layer structure was produced by forming the UV-shielding layers (A) produced in the same manner as Example 1 on both faces of the heat-shielding layer (A) produced in the same manner as Example 1.

EXAMPLE 6

A laminate glass was obtained in the same manner as Example 1, except that the interlayer film for a laminate glass with a three-layer structure was produced by forming the UV-shielding layers (A) produced in the same manner as Example 1 on both faces of the heat-shielding layer (B) produced in the same manner as Example 2.

EXAMPLE 7

A laminate glass was obtained in the same manner as Example 1, except that the interlayer film for a laminate glass with a three-layer structure was produced by forming the UV-shielding layers (B) produced in the same manner as Example 3 on both faces of the heat-shielding layer (A) produced in the same manner as Example 1.

EXAMPLE 8

A laminate glass was obtained in the same manner as Example 1, except that the interlayer film for a laminate glass with a three-layer structure was produced by forming the UV-shielding layers (B) produced in the same manner as Example 3 on both faces of the heat-shielding layer (B) produced in the same manner as Example 2.

EXAMPLE 9

An UV-shielding layer (C) was produced in the same manner as Example 1, except that ZnO fine particles (average particle diameter 80 nm) coated with silica were used as the UV-cutting agent in the production of the UV-shielding layer.

A laminate glass was obtained in the same manner as Example 1, except the heat-shielding layer (A) produced in the same manner as Example 1 and the UV-shielding layer (C) were used.

EXAMPLE 10

A laminate glass was obtained in the same manner as Example 1, except the heat-shielding layer (B) produced in the same manner as Example 2 and the UV-shielding layer (C) produced in the same manner as Example 9 were used.

EXAMPLE 11

An UV-shielding layer (D) was produced in the same manner as Example 1, except that CeO$_2$ fine particles (average particle diameter 80 nm) were used as the UV-cutting agent in the production of the UV-shielding layer.

A laminate glass was obtained in the same manner as Example 1, except the heat-shielding layer (A) produced in the same manner as Example 1 and the UV-shielding layer (D) were used.

EXAMPLE 12

A laminate glass was obtained in the same manner as Example 1, except the heat-shielding layer (B) produced in the same manner as Example 2 and the UV-shielding layer (D) produced in the same manner as Example 9 were used.

EXAMPLE 13

A laminate glass was obtained in the same manner as Example 1, except the interlayer film for a laminate glass with a three-layer structure was produced by forming the UV-shielding layers (C) produced in the same manner as Example 9 on both faces of the heat-shielding layer (A) produced in the same manner as Example 1.

EXAMPLE 14

A laminate glass was obtained in the same manner as Example 1, except the interlayer film for a laminate glass with a three-layer structure was produced by forming the UV-shielding layers (C) produced in the same manner as Example 9 on both faces of the heat-shielding layer (B) produced in the same manner as Example 2.

EXAMPLE 15

A laminate glass was obtained in the same manner as Example 1, except the interlayer film for a laminate glass with a three-layer structure was produced by forming the UV-shielding layers (D) produced in the same manner as Example 11 on both faces of the heat-shielding layer (A) produced in the same manner as Example 1.

EXAMPLE 16

A laminate glass was obtained in the same manner as Example 1, except the interlayer film for a laminate glass with a three-layer structure was produced by forming the UV-shielding layers (D) produced in the same manner as Example 11 on both faces of the heat-shielding layer (B) produced in the same manner as Example 2.

EXAMPLE 17

An UV-shielding layer (E) was produced in the same manner as Example 1, except that a malonic acid ester type UV absorbent (propanedioic acid, [(4-methoxyphenyl)-methylene]-dimethyl ester (manufactured by Clariant Inc., Hostavin PR-25)) was used as the UV-cutting agent in the production of the UV-shielding layer.

A laminate glass was obtained in the same manner as Example 1, except the heat-shielding layer (A) produced in the same manner as Example 1 and the UV-shielding layer (E) were used.

EXAMPLE 18

A laminate glass was obtained in the same manner as Example 1, except the interlayer film for a laminate glass with a three-layer structure was produced by forming the UV-shielding layers (E) produced in the same manner as Example 17 on both faces of the heat-shielding layer (A) produced in the same manner as Example 1.

COMPARATIVE EXAMPLE 1

The heat-shielding layer (A) was produced in the same manner as Example 1 and a laminate glass was obtained using only the obtained heat-shielding layer (A) in the same manner as Example 1.

COMPARATIVE EXAMPLE 2

The heat-shielding layer (B) was produced in the same manner as Example 2 and a laminate glass was obtained using only the obtained heat-shielding layer (B) in the same manner as Example 1.

The heat-shielding layers (A) and (B) produced in the respective Examples and Comparative Examples were subjected to evaluations of electromagnetic wave shielding property, haze, visible light transmittance, and solar radiation transmittance, and UV-shielding layers (A) to (E) were subjected to evaluations of UV transmittance, and the laminate glasses obtained in the respective Examples and Comparative Examples were subjected to evaluations of the weathering-resistance test according to the following methods.

(1) Electromagnetic Wave Shielding Property of Heat-shielding Layer

With respect to each laminate glass produced by separately sandwiching the heat-shielding layers (A) and (B) with clear glasses, the reflection loss value (dB) in a range of 0.1 to 10 MHz was compared with that of a common float glass single plate with a thickness of 2.5 mm by an electromagnetic wave transmittance KEC measurement method (peripheral field electromagnetic wave shielding effect measurement) and the minimum and maximum values of the difference at the above-mentioned frequency were recorded. The reflection loss value (dB) in a range of 2 to 26.5 GHz was measured by uprightly setting each sample of 600 mm square-size between a pair of antennas for transmission and reception and receiving electric wave from an electric wave signal generator by the spectrum analyzer to evaluate the shielding property of each sample (far field electromagnetic wave measurement method). The results are shown in Table 1.

(2) Haze of Heat-shielding Layer

With respect to each laminate glass produced by separately sandwiching the heat-shielding layers (A) and (B) with clear glasses, measurement was carried out in accordance with JIS K 6714. The results are shown in Table 1.

(3) Visible Light Transmittance and Solar Radiation Transmittance of Heat-shielding Layer With respect to each laminate glass produced by separately sandwiching the heat-shielding layers (A) and (B) with clear glasses, the visible light transmittance in a wavelength region of 380 to 780 nm was measured in accordance with JIS Z 8722 and JIS R 3106 (1998) by using a recording spectrophotometer (manufactured by Shimadzu Corporation, U 4000). Also, the solar radiation transmittance in a wavelength region of 300 to 2100 nm was measured and the ratio thereof to the visible light transmittance was calculated. The results are shown in Table 1.

(4) UV Transmittance of UV-shielding Layer

With respect to each laminate glass produced by separately sandwiching the UV-shielding layers (A) to (E) with clear glasses, the UV transmittance was measured in accordance with SAE J1796. The results are shown in Table 2.

(5) Weathering-resistance Test of Laminate Glass

With respect to each laminate glass produced in the respective Examples and Comparative Examples, the visible light transmittance in a wavelength region of 380 to 780 nm was measured in accordance with JIS Z 8722 and JIS R 3106 (1998) by using a recording spectrophotometer (manufactured by Shimadzu Corporation, U 4000). Also, the measurement was also carried out in the same manner after S-Xenon (Super Xenon) radiation test and ΔTv was calculated by comparison with the measurement result before radiation according to the following equation (1). The results are shown in Table 3.

Further, measurement was carried out so that the first layer in the light incident side is set to be a UV-shielding layer.

$\Delta Tv = Tv$ (after S-Xenon radiation)$-Tv$ (before S-Xenon radiation) \qquad (1)

Super Xenon (S-Xenon) Radiation Test

Each radiation sample of 5×10 cm was produced and subjected to the S-Xenon radiation test under the following conditions:
testing apparatus: Super-Xenon Weather meter (SX 75, manufactured by Suga Test Instruments Co., Ltd.);
UV intensity: 180 mW/m$^2$;
limited wavelength: 300 to 400 nm;
black panel temperature: 63° C.;
filter: quartz glass (inner)/#275 filter (outer); and
radiation duration: 100 hours.

With respect to each laminate glass produced in the respective Examples and Comparative Examples, similarly, the visible light transmittance in a wavelength region of 380 to 780 nm was measured in accordance with JIS Z 8722 and JIS R 3106 (1998) by using a recording spectrophotometer (manufactured by Shimadzu Corporation, U 4000). Also, the measurement was also carried out in the same manner after the following S-UV (Super-UV) radiation test and ΔTv was calculated by comparison with the measurement result before radiation according to the following equation (2). The results are shown in Table 3. Further, measurement was carried out so that the first layer in the light incident side is set to be a UV-shielding layer.

$\Delta Tv = Tv$ (after S-UV radiation)$-Tv$ (before S-UV radiation) \qquad (2)

Super UV (SUV) Radiation Test

Each radiation sample of 5×10 cm was produced and subjected to the SUV radiation test under the following conditions:
testing apparatus: EYE Super-UV tester (SUV-F11 model, manufactured by Iwasaki Electric Co., Ltd.);
UV intensity: 100 mW/m$^2$;
limited wavelength: 295 to 450 nm;
black panel temperature: 63° C.;
radiation duration: 300 hours.

TABLE 1

|  | electromagnetic wave shielding property (dB) | haze (%) | visible light transmittance (%) | ratio of solar radiation transmittance (%) |
|---|---|---|---|---|
| heat-shielding layer (A) | 1 | 0.5 | 82.9 | 57.2 |
| heat-shielding layer (B) | 1 | 0.5 | 83.5 | 58.3 |

TABLE 2

|  | UV transmittance (%) |
|---|---|
| UV-shielding layer (A) | 0.5 |
| UV-shielding layer (B) | 4.7 |
| UV-shielding layer (C) | 4.5 |
| UV-shielding layer (D) | 4.9 |
| UV-shielding layer (E) | 35.2 |

TABLE 3

|  |  | Weathering-resistance test Δ Tv (%) | |
|---|---|---|---|
|  | constitution of interlayer film | S-Xenon: 100 hr | S-UV: 300 hr |
| Example 1 | UV (A)/heat-shielding (A) | −0.32 | −2.0 |
| Example 2 | UV (A)/heat-shielding (B) | −0.67 | −2.4 |
| Example 3 | UV (B)/heat-shielding (A) | −0.72 | −2.5 |
| Example 4 | UV (B)/heat-shielding (B) | −0.75 | −2.9 |
| Example 5 | UV (A)/heat-shielding (A)/UV (A) | −0.32 | −1.8 |
| Example 6 | UV (B)/heat-shielding (A)/UV (B) | −0.51 | −1.9 |
| Example 7 | UV (A)/heat-shielding (B)/UV (A) | −0.47 | −1.9 |
| Example 8 | UV (B)/heat-shielding (B)/UV (B) | −0.49 | −2.1 |
| Example 9 | UV (C)/heat-shielding (A) | −0.7 | −2.2 |
| Example 10 | UV (C)/heat-shielding (B) | −0.75 | −2.3 |
| Example 11 | UV (D)/heat-shielding (A) | −0.69 | −2.6 |
| Example 12 | UV (D)/heat-shielding (B) | −0.73 | −2.7 |
| Example 13 | UV (C)/heat-shielding (A)/UV (C) | −0.47 | −1.7 |
| Example 14 | UV (C)/heat-shielding (B)/UV (C) | −0.48 | −2.0 |
| Example 15 | UV (D)/heat-shielding (A)/UV (D) | −0.48 | −1.8 |
| Example 16 | UV (D)/heat-shielding (B)/UV (D) | −0.50 | −2.0 |
| Example 17 | UV (E)/heat-shielding (A) | −0.35 | −1.5 |
| Example 18 | UV (E)/heat-shielding (A)/UV (E) | −0.30 | −1.2 |
| Comparative Example 1 | heat-shielding (A) | −1.10 | −3.1 |
| Comparative Example 2 | heat-shielding (B) | −1.92 | −5.2 | heat-shielding (A): heat-shielding layer (A)
heat-shielding (B): heat-shielding layer (B)
UV (A): UV-shielding layer (A)
UV (B): UV-shielding layer (B)
UV (C): UV-shielding layer (C)
UV (D): UV-shielding layer (D)
UV (E): UV-shielding layer (E)

As shown in Table 1 to Table 3, the heat-shielding layers produced in the respective Examples and Comparative Examples all had an electromagnetic wave shielding property of 10 dB or lower, a haze of 1.0% or lower, a visible light transmittance of 70% or higher, and a solar radiation transmittance of 85% or lower of the visible light transmittance, and the UV-shielding interlayer films produced in the respective Examples had UV transmittance of 30% or lower.

The laminate glasses according to Examples were found having ΔTv, which was calculated from the visible light transmittance values before and after the weathering-resistance test, closer to 0 than ΔTv of the laminate glasses according to Comparative Examples, which was calculated from the visible light transmittance values before and after the weathering-resistance test and it implies the laminate glass plates according to Examples were excellent in weathering-resistance.

INDUSTRIAL APPLICABILITY OF THE INVENTION

The present invention provided an interlayer film for a laminate glass which is excellent in transparency, heat-shielding property, and electromagnetic wave transmittance in the case of use for a laminate glass and is not deteriorated in the visible light transmittance and the initial optical properties even after a durability test to light and provide a laminate glass comprising the interlayer film for a laminate glass.

The invention claimed is:

1. An interlayer film for a laminate glass,
which comprises at least one of each of a heat-shielding layer and a UV-shielding layer;
wherein the heat-shielding layer has an electromagnetic wave shield capability of 10 dB or lower at a frequency of 0.1 MHz to 26.5 GHz; a haze of 1.0% or lower; a visible light transmittance of 70% or higher; and a solar radiation transmittance of 85% or lower of the visible light transmittance in a wavelength range of 300 to 2,100 nm in the case where the heat-shielding layer is inserted between two plates of glass selected from a group consisting of clear glass, green glass, high heat ray absorption glass and UV absorption glass to obtain a laminate glass, and wherein the UV-shielding layer has an UV transmittance of 10% or lower measured in accordance with SAE J1796 in the case where the UV-shielding layer is inserted between two plates of glass selected from a group consisting of clear glass, green glass, high heat ray absorption glass, and UV absorption glass to obtain a laminate glass.

2. The interlayer film for a laminate glass according to claim 1, which comprises three layers composed of at least the heat-shielding layer and the UV-shielding layers formed on both faces of the heat-shielding layer.

3. The interlayer film for a laminate glass according to claim 2, wherein the heat-shielding layer contains a transparent resin and a heat-shielding agent.

4. The interlayer film for a laminate glass according to claim 2, wherein the heat-shielding layer contains 100 parts by weight of a polyvinyl acetal resin, 20 to 60 parts by weight of a plasticizer, 0.0001 to 1.0 part by weight of an alkali metal salt and/or alkaline earth metal salt, 0.1 to 3.0 parts by weight of a tin-dope indium oxide fine particle, 0.01 to 5.0 parts by weight of a dispersion stabilizer, and 0.01 to 5.0 parts by weight of an antioxidant, the tin-dope indium oxide fine particle having an average particle diameter of 80 nm or smaller and being dispersed so as to adjust the number of the particle with 100 nm or larger particle diameter to be 1 or less per 1 μm$^2$.

5. The interlayer film for a laminate glass according to claim 1, wherein the heat-shielding layer contains a transparent resin and a heat-shielding agent.

6. The interlayer film for a laminate glass according to claim 1, wherein the heat-shielding layer contains 100 parts by weight of a polyvinyl acetal resin, 20 to 60 parts by weight of a plasticizer, 0.0001 to 1.0 part by weight of an alkali metal salt and/or alkaline earth metal salt, 0.1 to 3.0 parts by weight of a tin-dope indium oxide fine particle, 0.01 to 5.0 parts by weight of a dispersion stabilizer, and 0.01 to 5.0 parts by weight of an antioxidant, the tin-dope indium oxide fine particle having an average particle diameter of 80 nm or smaller and being dispersed so as to adjust the number of the particle with 100 nm or larger particle diameter to be 1 or less per 1 μm$^2$.

7. The interlayer film for a laminate glass according to claim 1, wherein the UV-shielding layer contains a transparent resin and an UV-cutting agent.

8. The interlayer film for a laminate glass according to claim 7, wherein the UV-cutting agent is at least one kind of UV absorbents selected from a group consisting of metal, metal oxide, benzotriazole, benzophenone, triazine, benzoate, malonic acid ester, and oxalic acid anilide.

9. The interlayer film for a laminate glass according to claim 7, wherein the UV-cutting agent is a metal oxide UV absorbent.

10. The interlayer film for a laminate glass according to claim 9, wherein the metal oxide UV absorbent is zinc oxide and/or titanium oxide.

11. The interlayer film for a laminate glass according to claim 9, wherein the metal oxide UV absorbent is coated with an insulating metal oxide on the surface.

12. The interlayer film for a laminate glass according to claim 11, wherein the insulating metal oxide is silica.

13. The interlayer film for a laminate glass according to claim 9, wherein the metal oxide UV absorbent is coated with a hydrolyzable organic silicon compound on the surface.

14. The interlayer film for laminate glass according to claim 9, wherein the metal oxide UV absorbent is coated with a silicone compound on the surface.

15. The interlayer film for a laminate glass according to claim 1, wherein a visible light transmittance decrease is 1.0% or lower measured in accordance with JIS Z 8722 and JIS R 3106 (1998) after the interlayer film is inserted between two plates of glass selected from a group consisting of clear glass, green glass, high heat ray absorption glass, and UV absorption glass to obtain a laminate glass; and Super Xenon 100-hours radiation test is run for the laminate glass.

16. The interlayer film for a laminate glass according to claim 1, wherein a visible light transmittance decrease is 3.0% or lower measured in accordance with JIS Z 8722 and JIS R 3106 (1998) after the interlayer film is inserted between two plates of glasses selected from a group consisting of clear glass, green glass, high heat ray absorption glass, and UV absorption glass to obtain a laminate glass; and Super UV 300-hours radiation test is run for the laminate glass.

17. A laminate glass, which is obtainable by using the interlayer film for the laminate glass according to claim 1.

* * * * *